United States Patent [19]

Hernandez

[11] 4,436,340
[45] Mar. 13, 1984

[54] FISHING SEAT, ROD HOLDER AND PAIL

[76] Inventor: Henry Hernandez, 1085 Admont Ave., Franklin Square, N.Y. 11010

[21] Appl. No.: 287,188

[22] Filed: Jul. 27, 1981

[51] Int. Cl.³ .............................................. A47C 9/00
[52] U.S. Cl. ..................................... 297/193; 297/217; 43/17
[58] Field of Search ............... 297/193, 192, 188, 217; 43/54.1, 55, 56, 17

[56] References Cited

U.S. PATENT DOCUMENTS

| | | | |
|---|---|---|---|
| 1,426,211 | 8/1922 | Pausin | 43/56 X |
| 1,822,638 | 9/1931 | Aiello | 297/188 |
| 1,912,064 | 5/1933 | Bowers | 297/193 |
| 2,480,759 | 8/1949 | Morreau | 43/56 |
| 3,010,239 | 11/1961 | Johnson | 43/17 |
| 3,283,438 | 11/1966 | Wagner | 43/17 |
| 3,359,928 | 12/1967 | Gamble | 297/188 |
| 3,571,964 | 3/1971 | Bogarthy | 43/55 |
| 4,106,811 | 8/1978 | Hernandez | 297/193 |
| 4,295,680 | 10/1981 | Grasso | 297/193 |

Primary Examiner—Francis K. Zugel
Attorney, Agent, or Firm—James P. Malone

[57] ABSTRACT

A combined fishing seat, rod holder and pail. An elongated horizontal seat is adapted to be mounted on a pail positioned under the seat, the pail having a pair of holes in its side. A mounting member is fixedly connected to the underside of the seat and adapted to fit into the pail. A pair of extension members extend from the ends of the mounting member, the extension member fitting into the holes in the pail. The seat member has a plurality of holes for mounting fishing rods and other apparatus.

2 Claims, 5 Drawing Figures

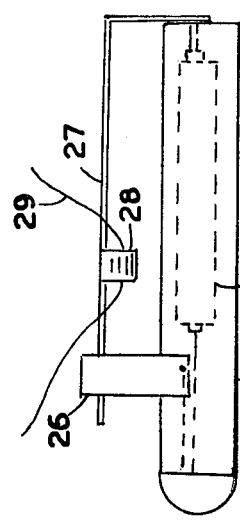
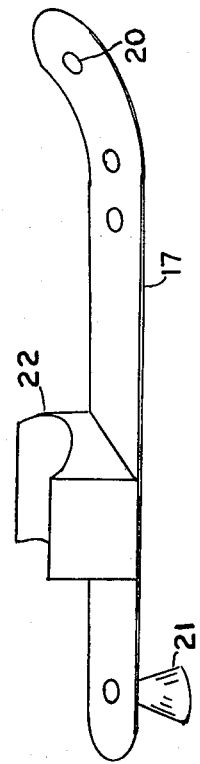
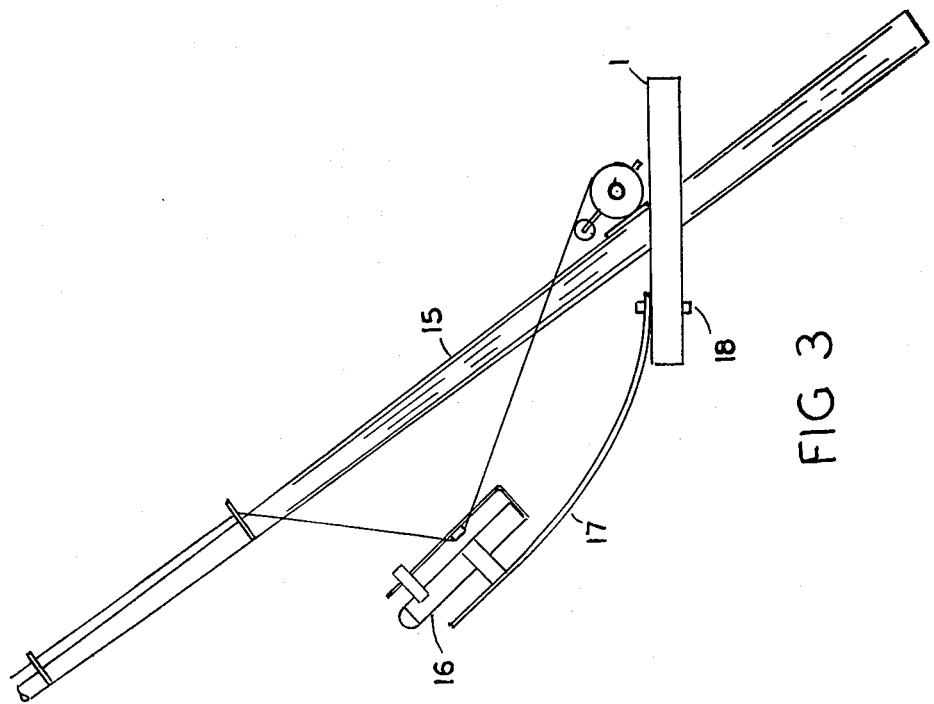

FISHING SEAT, ROD HOLDER AND PAIL

This invention is an improvement over Applicant's prior patent, U.S. Pat. No. 4,106,811, granted on Aug. 15, 1978.

1. Technical Field

This invention relates to fishing apparatus and more particularly, to a combined fishing seat, rod holder and pail.

2. Prior Art

The following patents are considered pertinent.

Applicant's prior patent U.S. Pat. No. 4,106,811, and the references cited against it.

BACKGROUND OF THE INVENTION

This invention relates to an improved combination of a holding device for fishing rods, a fisherman's seat and a container for caught fish.

A common problem associated with the sport of fishing is that the fisherman can become very tired from constant standing and from constantly holding a fishing rod in the proper attitude in preparation for hauling a caught fish. Presently available devices for solving these problems have proven either too expensive or too cumbersome to use or carry to the fishing spot desired.

OBJECTS OF THE INVENTION

It is an object of the invention to provide a fishing rod holding device which is simply constructed, is portable and can be constructed inexpensively.

It is a further object of the invention to provide a fishing rod holding device which also serves as a seat for the fisherman and as a container for caught fish.

Another object of the invention is to provide a fishing seat, rod holder and pail comprising: an elongated horizontal seat member, a pail positioned under said seat, a pair of holes in the side of the pail along a diameter, a mounting member fixedly connected to the underside of the seat and adapted to fit into the pail, a pair of extension members extending from the ends of the mounting member, the extension members being adapted to fit into the holes in the pail.

These and other objects of the invention will be apparent from the following specification and drawings.

BRIEF DESCRIPTION OF THE DRAWINGS

FIG. 3 is a side detail view illustrating a mounting fishing rod and alarm.

FIG. 4 is a detail perspective view of the alarm holder.

FIG. 5 is a side view of a warning alarm.

BEST MODE OF THE INVENTION

Figure 2:
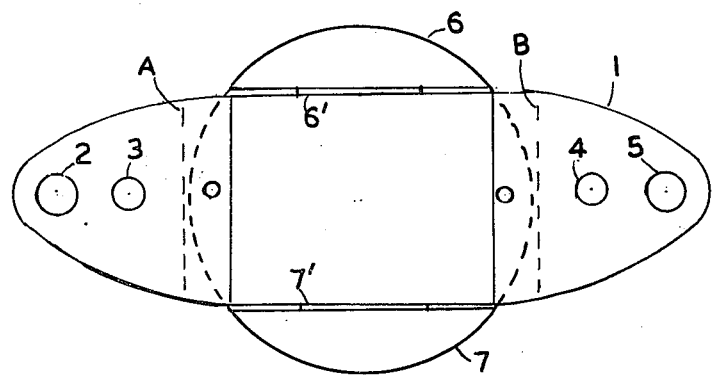
FIG. 2 is a top view of FIG. 1.
Figure 1:
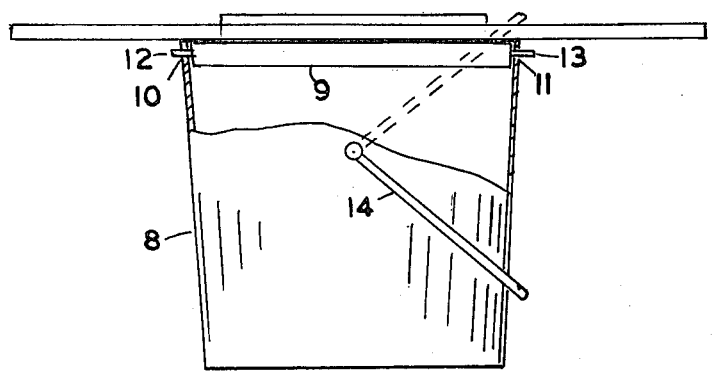
FIG. 1 is a side view of an embodiment of the invention.

Referring to FIGS. 1 and 2, the invention comprises an elongated seat member 1, having a plurality of holes 2, 3, 4 and 5, for mounting a fishing rod, warning alarms and/or cylindrical containers for holding fishing implements, and/or bait, and a pair of curved members 6, 7, hingedly mounted to the side of the member 1 by the hinges 6', 7'. The elongated seat member is mounted on the pail 8, by means of a mounting member 9, which is fixedly connected to the underside of the seat member 1. The pail has a pair of holes 10, 11, in the side thereof along a diameter and the mounting member 9 has a pair of extensions 12, 13, which are adapted to extend through the holes 10, 11. The pail is preferably made of plastic and is sufficiently flexible so that it can be distorted for the purpose of inserting the members 12, 13, into the holes 10 and 11. The members 12 and 13 may be wooden or other dowels mounted in the ends of the member 9. If it is desired to use a pail that is not sufficiently flexible, the dowel extension members may be spring loaded so as to be retracted for mounting the member 9 in the pail 8. The pail is otherwise conventional and preferably has a handle 14. The handle may be swung towards an upper position by temporarily removing the seat member 1.

When in fishing use, the pail is preferably partially filled with water so that when a fish is caught, one of the hinged members 6 and 7 is folded up and the fish inserted into the pail to keep it fresh. The water also serves to anchor the pail and improve its stability.

The seat member 1 may be hinged along the lines A and B if desired, for more compact storage.

FIG. 3 shows a side view of the member 1 with a fishing rod 15 mounted in one of the mounting holes. FIG. 3 also shows a warning alarm 16 for indicating when a fish has struck the line. The alarm 16 may be mounted on a bracket 17 which may be mounted on the member 1, by means of the bolt 18.

FIG. 4 shows a perspective view of the bracket 17 for holding the alarm 16. The bracket is a metal strip curved at one end and having mounting holes 20. The metal strip is preferably flexible and a small bell 21 may be mounted on the free end. A clip 22 is mounted on the strip 17 for holding the alarm 16.

Referring to FIG. 5, the alarm 16 comprises a tubular container 23 which contains a battery 24 and a switch 25 connected to the battery. The switch comprises a fixed loop 26 connected to the tubular member and electrically connected to one end of the battery. The other member of the switch is a flexible strip 27 which is mounted on the tubular container 23 and electrically connected to the other end of the battery. The strip 27 has a curved transverse strip 28 and the fishing line 29 is passed under the curved strip 28 so that when a pull is exerted on the line 29 which will raise the strip 27 into electrical contact with the loop 26 thereby energizing the warning alarm.

The warning indicator may be a light bulb 30 or a buzzer or other conventional warning indicator.

It is claimed:

1. A combined fishing seat, rod holder and pail, comprising:
    an elongated horizontal seat member,
    a pail positioned under said seat, a pair of holes in the side of the pail along a diameter,
    a mounting member fixedly connected to the underside of the seat and adapted to fit into the pail,
    a pair of extension members extending from the ends of the mounting member, the extension members being adapted to fit into the holes in the pail,
    a pair of members hinged to the elongated seat member so as to cover the pail opening, and
    a plurality of mounting holes mounted adjacent the ends of the horizontal seat member whereby fishing rods, warning indicators and containers may be mounted in said holes.

2. Apparatus as in claim 1 having a warning indicator mounted in one of said holes in said seat member, the warning indicator being adapted to be connected to a fishing line to indicate when a fish has struck the hook on the line.

* * * * *